(12) United States Patent
Simon et al.

(10) Patent No.: US 7,997,802 B2
(45) Date of Patent: Aug. 16, 2011

(54) AXIAL PLAIN BEARING ASSEMBLY

(75) Inventors: Clemens Simon, Starnberg (DE); Peter Feigl, Höhenrain (DE)

(73) Assignee: Carl Freudenberg KG, Weinheim (DE)

( * ) Notice: Subject to any disclaimer, the term of this patent is extended or adjusted under 35 U.S.C. 154(b) by 784 days.

(21) Appl. No.: 11/985,919

(22) Filed: Nov. 19, 2007

(65) Prior Publication Data

US 2008/0181546 A1 Jul. 31, 2008

Related U.S. Application Data

(63) Continuation-in-part of application No. 10/843,630, filed on May 12, 2004, now abandoned.

(30) Foreign Application Priority Data

May 13, 2003 (DE) .............................. 203 07 447 U

(51) Int. Cl.
   *F16C 33/74* (2006.01)
   *F16C 33/06* (2006.01)
(52) U.S. Cl. ........................................ 384/130; 384/121
(58) Field of Classification Search .................. 384/129, 384/121, 123, 114, 112, 134, 107, 130, 131, 384/132; 277/399, 400
   See application file for complete search history.

(56) References Cited

U.S. PATENT DOCUMENTS

| 1,595,800 A | 8/1926 | McCarty |
|---|---|---|
| 3,077,296 A | 2/1963 | Ping, Jr. |
| 3,195,902 A | 7/1965 | Tisch |
| 3,384,428 A | 5/1968 | Hidge |
| 4,095,857 A | 6/1978 | Palmer |
| 4,157,834 A | 6/1979 | Burdette |
| 5,123,660 A * | 6/1992 | Dahlheimer et al. ......... 277/393 |
| 5,531,458 A | 7/1996 | Sedy |
| 5,658,080 A | 8/1997 | Ichiyama et al. |
| 6,066,903 A | 5/2000 | Ichiyama et al. |
| 6,325,380 B1 | 12/2001 | Feigl et al. |

FOREIGN PATENT DOCUMENTS

DE 2337844 2/1975

(Continued)

OTHER PUBLICATIONS

European Search Report dated Feb. 2, 2009 for EP08018473.

(Continued)

*Primary Examiner* — Justin Krause
(74) *Attorney, Agent, or Firm* — Scott D. Wofsy; Edwards Angell Palmer & Dodge LLP

(57) ABSTRACT

An axial plain bearing assembly includes a thrust ring provided for common rotation with a rotary component. The thrust ring has a radial seal face on an end face thereof for co-operating with a radial seal face of a non-rotational seal ring of a gas-lubricated mechanical face seal assembly for sealing said rotary and stationary components against each other. A plurality of peripherally spaced gas-pumping grooves is formed in at least one of the radial seal faces of the thrust and non-rotational seal rings. A mass ring connected with the thrust ring is provided at an axial distance from the thrust ring. The mass ring is configured and adapted to exert a balancing force on the thrust ring under centrifugal forces acting on the mass ring during common rotation of the mass and thrust rings to compensate for thermal distortion of the thrust ring during operation.

18 Claims, 2 Drawing Sheets

FOREIGN PATENT DOCUMENTS

| | | |
|---|---|---|
| DE | 2361797 | 6/1975 |
| DE | 3804886 | 8/1989 |
| DE | 3809703 | 10/1989 |
| DE | 39 21 880 A1 | 1/1991 |
| DE | 29908918 | 7/1999 |
| EP | 0035891 | 9/1981 |
| EP | 0896163 | 2/1999 |
| EP | 1054196 | 11/2000 |
| EP | 1479929 | 11/2004 |
| FR | 1550906 | 12/1968 |
| JP | 58-57564 | 4/1983 |
| JP | 63 156432 U 13 | 10/1988 |

OTHER PUBLICATIONS

Office Action dated Mar. 16, 2010, drawn up for co-pending European Patent Application No. 04 009 372.6.

Burgmann, Gasgeschmierte Gleitringdichtungen, self-published, 1997 ISBN 3-929682-15-X, pp. 16-17.

Burgmann, ABC der Gleitringdichtung, self-published, 1998, pp. 160,161, 272-273.

* cited by examiner

AXIAL PLAIN BEARING ASSEMBLY

CROSS REFERENCE TO RELATED APPLICATIONS

This application is a continuation-in-part of U.S. patent application Ser. No. 10/843,630 filed May 12, 2004, which claims priority to German Utility Model Application No. 203 07 447.5, filed May 13, 2003, which are incorporated by reference herein in their entireties.

BACKGROUND OF THE INVENTION

1. Field of the Invention

The present invention relates to an axial plain bearing assembly and in particular, to an axial plain bearing assembly suitable for the axial support of the drive shaft of a combustion air-charge compressor for use in internal combustion engines.

2. Background of the Related Art

For the axial support and sealing of the drive shaft of a turbo-mechanically driven centrifugal or screw-type compressor or a turbo compressor having an exhaust-gas driven turbine, the special operating conditions of such aggregates require appropriate attention. For instance the drive shafts generally have a very small diameter that is frequently substantially less than 40 mm, and, at the same time, these shafts are rotated at very high rotational speeds of e.g. $10^5$ min$^{-1}$ and more.

The seal of such compressors can be subjected to both over pressure and low pressure conditions prevailing in the interior of the compressor casing. Therefore it should be ensured that the gaseous medium requiring sealing, which is usually air, be kept free as far as possible of non-gaseous components such as oil particles since oily residues would otherwise enter the combustion chamber of an internal combustion engine thereby having an environmental impact (the production of plumes of smoke from the exhaust) apart from affecting the operational behaviour of the internal combustion engine. Hitherto, labyrinth seals or a sealing effect produced by means of piston rings were mostly used, both of which are associated with a relatively high degree of leakage. Also mechanical face seal assemblies (e.g., those described in EP-A-1 054 196) have already been installed because of their substantially smaller degree of leakage, whereby care must be taken to prevent dry-running.

Plain bearings are generally preferred for the radial and axial support of the drive shaft. The separate structural measures for the sealing and bearing functions involve an increase in the structural parts and assembly costs for fulfilling the functions of supporting and sealing. On the other hand charge compressors of the present type are typically mass-produced and should be suitable for automatic handling in motor vehicle production lines. This requirement can be taken into account all the more easily, the smaller the number of parts that have to be handled and assembled.

The conventional methods and systems generally have been considered satisfactory for their intended purpose. However, there remains a need in the art for a method and system providing improved axial support and sealing of a shaft, particularly in the driving shaft of a compressor. There also remains a need in the art for such a system and method that have low part counts, and are easy and inexpensive to make and use. The present invention provides a solution for these problems.

SUMMARY OF THE INVENTION

An object of the present invention is to provide an improved axial plain bearing assembly. A specific object of the present invention is to provide an axial plain bearing assembly for optimizing the functions of axial support and sealing of a shaft, in particular the driving shaft of a charge compressor, in regard to the number of parts required for performing both of these functions.

The subject invention is directed to an axial plain bearing assembly including an axial plain bearing portion and a gas-lubricated mechanical face seal portion. The axial bearing portion includes a thrust ring provided for common rotation with a rotary component and a counter ring provided for mounting non-rotationally on a stationary component. The thrust and counter rings having bearing faces facing each other. The thrust ring further includes a radial seal face on an end face thereof remote from the counter ring for co-operating with a radial seal face of a non-rotational seal ring of said mechanical face seal portion for sealing said rotary and stationary components against each other. A plurality of peripherally spaced gas-pumping grooves are formed in at least one of the radial seal faces of the thrust ring and the non-rotational seal rings. The gas-pumping grooves extend from one circumference of one seal face towards the other circumference thereof and terminate at a radial distance from the other circumference. A mass ring connected with the thrust ring is provided at a side thereof remote from the counter ring at an axial distance from the thrust ring for exerting a balancing force on the thrust ring under centrifugal forces acting on the mass ring during common rotation of the mass and thrust rings. The mass ring is configured and adapted to compensate for thermal distortion of the thrust ring caused by friction heat generated in the axial plain bearing portion during operation.

It is possible for the mass and thrust rings can be integral with each other. It is also contemplated that a first spacer ring can be disposed between the mass and thrust rings and a second spacer ring can be disposed at a side of the thrust ring facing the counter ring. The first spacer ring can be integral with the mass ring at one axial end thereof and with the thrust ring at the other axial end thereof. The second spacer ring can be integral with the thrust ring, thereby forming an integral mounting unit comprising said thrust ring, said mass ring, and said first and second spacer rings.

The counter ring can include at least one passage opening at the bearing surface of the counter ring for supplying bearing oil to the bearing surfaces. It is also contemplated that the assembly can further include means for removing bearing oil from an area peripherally outward of the bearing surfaces. An oil retaining means can encompass the outer circumference of the bearing surfaces.

The gas-pumping grooves can be provided on the thrust ring, on the non-rotational seal ring, or both. The seal face(s) with gas-pumping grooves can have a surface area ratio $F_{GFA}/F_G$ within a range of between about 0.35 and about 0.65, and preferably between 0.4 and 0.6, where: $F_{GFA}$=total surface area of the gas-pumping grooves projected onto the seal face, and $F_G$=total surface area of the seal face. A load ratio k, defined as the ratio of an effective surface area $F_H$ of the face seal assembly hydraulically loaded by pressure of a medium being sealed to a surface area $F_G$ of the seal face can be in a range of between about 0.5 and about 1.2.

It is contemplated that the thrust ring can include a steel material. The counter ring can include a bearing material selected from a group consisting of bronze. Other suitable materials and combinations thereof can also be provided.

The axial plain bearing assembly according to the present invention not only functions as an axial support of the drive shaft that is particularly effective at high to very high rotational speeds, but, at the same time, it provides a highly effective gas-lubricated mechanical face seal in that the assembly a rotary thrust ring of the axial plain bearing assembly has a seal face on an end face thereof opposite to that having a conventional bearing surface. Although the thrust ring takes on the function of a rotary seal ring in a gas-lubricated mechanical face seal, thereby simultaneously resulting in a corresponding saving in number of components, distortion of the thrust ring caused by thermal effects from the side of the axial bearing assembly is prevented in an effective manner. Such distortion would result in a harmful change of the shape of a sealing gap of the mechanical face seal formed during operation. Assembly of the components for axially supporting a shaft, and especially the drive shaft of a compressor, is simplified since there is only a single assembly step for obtaining the two functions of axial support and sealing. If desired, the multi-function thrust ring and the mass ring may be an integral part of a shaft bushing or may be provided pre-assembled thereon. The structure that includes the seal, the bearing and the shaft bushing may be provided as a pre-assembled unit and may be inserted into a boring of a casing, e.g. a compressor casing, which has to be sealed, in an assembly-friendly manner. Part-by-part assembly at the point of use can likewise be affected in problem-free manner. A further advantage arising from the design of the thrust ring as a multi-function component is that the labour intensive grinding processes required for providing the bearing and seal faces on the thrust ring can be carried out, if necessary without re-clamping, on one and the same machine tool.

These and other features, as well as further advantages and effects, of the axial plain bearing assembly of the subject invention will become more readily apparent to those skilled in the art from the following detailed description of the preferred embodiment taken in conjunction with the drawings.

BRIEF DESCRIPTION OF THE DRAWINGS

So that those skilled in the art to which the subject invention appertains will readily understand how to make and use the axial plain bearing assembly of the subject invention without undue experimentation, preferred embodiments thereof will be described in detail hereinbelow with reference to certain figures, wherein.

DETAILED DESCRIPTION OF A PREFERRED EMBODIMENT

Figure 1:
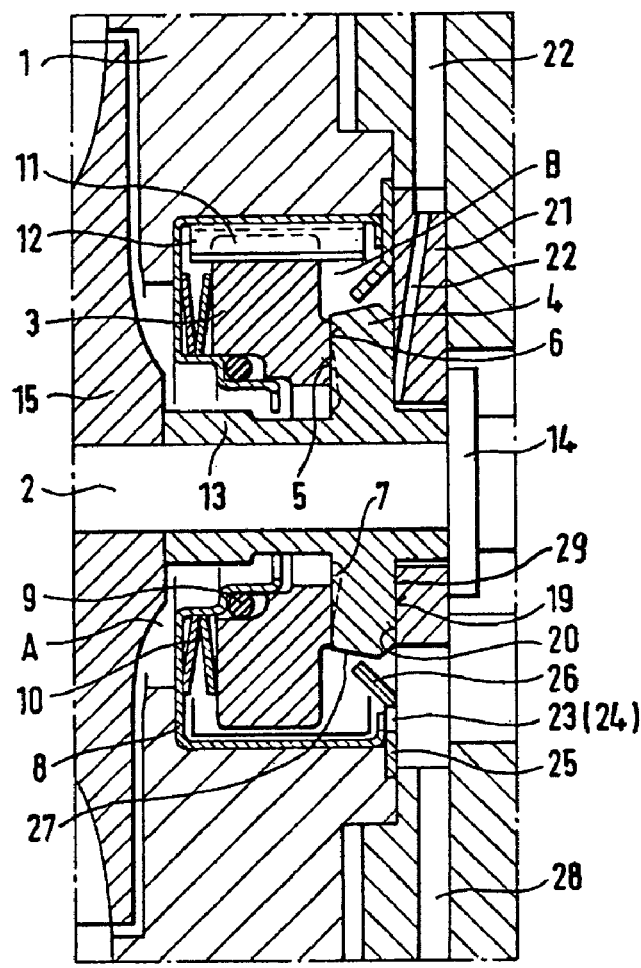
FIG. 1 is a longitudinal sectional view of an axial plain bearing assembly constructed in accordance with a preferred embodiment of the subject invention, showing the axial plain bearing assembly installed in a compressor casing.
Figure 2:
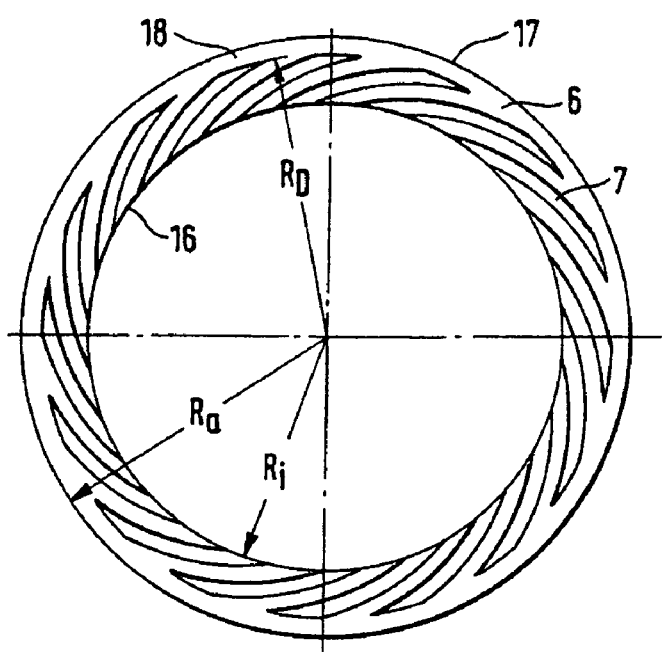
FIG. 2 is a front view of the seal face of a thrust ring of the axial plain bearing assembly of FIG. 1, showing a plurality of gas-pumping grooves.

Reference will now be made to the drawings wherein like reference numerals identify similar structural features or aspects of the subject invention. Although the invention is described hereinafter in connection with the axial support and sealing of the drive shaft of a charge compressor of internal combustion engines, it should be understood that the invention is not limited to this field of application. Rather, the invention could also be used advantageously whenever a shaft of comparatively small diameter that is driven at a high rotational speed needs to be axially supported in a friction-minimizing manner and sealed with respect to a casing and the medium requiring sealing is a gas such as air.

The axial plain bearing assembly according to the invention includes an axial plain bearing portion and a mechanical face seal portion mounted in a passage boring in a compressor casing 1, through which a shaft 2 (indicated schematically in the drawing) extends. The mechanical face seal portion comprises a seal ring 3, which is held non-rotationally but is axially moveable and disposed co-axial relative to the shaft 2, and a ring 4 which is arranged on the shaft 2 for common rotation therewith and which, according to the invention, is in the form of a thrust ring of the axial bearing portion. Rings 3, 4 have essentially radial seal faces 5, 6 facing each other. Direction-of-rotation dependent, gas-pumping structures or grooves 7 are formed in at least one of the seal faces 5, 6, preferably in the seal face 6 of the thrust ring 4, using known techniques such as grinding, lasering or stamping, in order to pump a gas between the seal faces 5, 6 and develop a pressure when the shaft 2 rotates, thereby forming a gap between the seal faces 5, 6. As a consequence thereof, a gas cushion will be formed between the seal faces 5, 6 for separating the seal faces 5, 6 from each other in order to seal a space or zone A peripherally inward of the seal faces 5, 6 with respect to a space or zone B peripherally outward thereof. Such gas-pumping grooves 7 are known to those skilled in the art. In regard to the specific details thereof, including suitable designs of the gas-pumping grooves, reference may be made to page 16, et seq., of BURGMANN, Gasgeschmierte Gleitringdichtungen, self published, 1997, ISBN 3-929682-15-X, which is incorporated by reference herein in its entirety.

The non-rotational seal ring 3 is accommodated in a mounting casing 8 mounted on the compressor housing 1 in a manner not-illustrated, and it is sealed thereagainst by a secondary seal 9 in the form of an O-ring. For further details of an O-ring type secondary seal including materials appropriate therefor, and alternative forms of secondary seals, reference may be made to pages 161, 272-273 of BURGMANN, ABC der Gleitringdichtung, self-published, 1988, which is incorporated by reference herein in its entirety.

A spring biasing means 10 that may take the form of one or more wave springs is located between the mounting casing 8 and the non-rotational seal ring 3, as shown in FIG. 1. The spring biasing means 10 causes the non-rotational seal ring 3 to be pressed against the thrust ring 4 rotating with the shaft 2 by a suitable bias force so that the seal faces 5, 6, of the rings 3, 4 are held together in sealing engagement with each other when the shaft 2 is stationary. In the outer periphery of the non-rotational seal ring 3, there is an axially extending groove 11 (a plurality of such grooves, distributed peripherally, could also be provided), into which projects a coupling finger 12 that protrudes radially from the mounting casing 8 towards the seal ring 3. The non-rotational seal ring 3 is thereby prevented from rotating relative to the mounting casing 8 but can move axially relative thereto.

The rotary thrust ring 4 may be mounted on the shaft 2 in any appropriate manner for the purposes of rotating in common therewith. In the present embodiment, it is an integral part of a bushing 13 that is seated on the shaft 2 and is clamped axially between a shoulder 14 of the shaft and a compressor impeller 15 mounted on the shaft 2 so that the rotation of the shaft 2 can be transferred to the thrust ring 4 without slippage. The thrust ring 4 could also be in the form of a separate component mounted on the shaft 2 or on a shaft bushing.

The preferred materials for the thrust ring 4 are high tensile materials such as suitable steel materials with or without a coating on the seal face side. For the purposes of minimizing wear, the stationary seal ring 3 preferably consists of tribologically effective materials such as a suitable carbon material, and it may, if desired, be impregnated with antimony at the seal face side using known techniques.

A large number of equally spaced, peripherally distributed gas-pumping grooves 7 are formed in the seal face 6 of the thrust ring 4. Each gas-pumping groove 7 is curved in the manner of a plough blade and extends from the inner circumference 16 of radius $R_i$ of the seal face 6 up to a radius $R_D$ of the seal face 6 that is radially spaced from the outer periphery 17 thereof having the radius $R_a$, thereby leaving a dam portion 18 near the outer circumference 17 which is free of gas-pumping grooves 7.

A ratio of the surface area $F_{GFA}$ covered by the gas-pumping grooves 7 to the total surface area $F_G$ of the seal face 6 is preferably such that direct contact between the seal faces 5, 6 is avoided both in normal operation as well as when starting and during stoppage of the shaft 2 even in the case of very small shaft diameters of e.g. 8 to 25 mm, this is done by forming a sealing gas cushion therebetween with the aid of the gas-pumping grooves 7. It has been established that these effects are obtained if certain factors for the surface area ratio $F_{GFA}/F_G$ are adhered to, and in particular, the surface area ratio should lie in the range between 0.35 and 0.65, preferably 0.4 and 0.6. Furthermore, the radial dimensions ($R_a$-$R_i$) of the seal face 6 should not fall below a minimum amount whilst the radial dimensions ($R_a$-$R_D$) of the dam portion 18 should be kept to a minimum. As an example, sixteen gas-pumping grooves 7 having plough-blade-like leading and lagging edges may be provided around the periphery of the seal face 6.

It has also been established that particularly advantageous operational properties of the sealing portion are obtained if a load ratio k, defined as the ratio of an effective surface area of the seal portion hydraulically loaded by the pressure of the medium being sealed to the surface area of the seal face, is in a specific range k=0.5 to 1.2.

For further details in regard to suitable radial dimensions ($R_a$-$R_i$) for the seal face 6 and radial dimensions ($R_a$-$R_D$) for the dam portion 18, reference can be made to EP-A-1 054 196, which is incorporated by reference herein in its entirety.

The reason the gas-pumping grooves 7 should preferably extend from the inner circumference 16 of the seal face 6 is that the medium requiring sealing in the zone A is practically free of non-gaseous constituents, e.g. oil particles, which could have detrimental effects upon the operational behaviour of the sealing portion if they were to enter the region between the seal faces 5, 6. By contrast, although the number of non-gaseous constituents e.g. oil particles in the gaseous medium on the atmospheric side is very small e.g. in the air in the space B, it is not negligible as will be discussed in more detail hereinafter. The emergence of the gas-pumping grooves 7 at the inner circumference of the seal face 6 ensures that there will be a leakage current of the medium being sealed from the space A towards the space B and thereby effectively prevents non-gaseous constituents infiltrating into space A from space B.

As is shown in FIG. 1, the end face of the thrust ring 4 remote from the seal face 6 thereof is provided with an essentially radially aligned bearing surface 19 which cooperates with an opposing parallel bearing surface 20 of a counter ring 21 of the axial bearing portion that is mounted in relatively non-rotational manner on the casing 1 in order to form an axial plain bearing. When the axial plain bearing assembly is operative, an oil film 29 is formed between the bearing surfaces 19, 20 thereby enabling a wear-minimized relative motion between the bearing surfaces 19, 20 in a manner known in the field of axial plain bearings.

The formation of an oil film can be enhanced by feeding bearing oil into the area between the bearing surfaces 19, 20 through an oil supply passage 22 which preferably opens at or close to the inner periphery of the bearing surface 20 of the counter ring 21. When the axial plain bearing assembly is operative, the bearing oil is forced to move from the inner to the outer periphery of the bearing surfaces 19, 20 due to the effect of the centrifugal forces prevailing. The bearing oil is preferably supplied through one or more passages 22 that penetrate the counter ring 21, at a slightly excessive pressure of e.g. 1 to 2 bar, and it leaves the bearing surfaces 19, 20 at the outer periphery of the thrust ring 4 in an essentially pressure-free state. The bearing oil may be the operating oil (engine oil) of an internal combustion engine; however it could also be provided from a separate oil-supply source.

The counter ring 21 preferably consists of a suitable bearing material such as bronze. The bearing surfaces 19, 20 are polished in appropriate manner. The bearing surface 19 of the thrust ring 4 is preferably cross-ground for improving the running properties with respect to the counter ring 21.

An oil retaining means 23 is provided for preventing the bearing oil emerging from the outer periphery of the bearing surfaces 19, 20 from being spun unhindered into the space B in order to prevent the space B from being excessively loaded with particles of bearing oil. Although other means of this type could be provided, the preferred oil retaining means 23 shown in the drawing includes a bent sheet 24 which is fixed to the casing 1 or counter ring 21 in appropriate manner e.g. by means of a radial arm 25 which might be screwed thereto, and which comprises an angled arm 26 that surrounds or covers in roof-like manner the point at which the bearing oil emerges from the outer periphery of the bearing surfaces 19, 20 as well as at least a part of the outer periphery of the thrust ring 4, said angled arm being radially spaced outwardly thereof. The bearing oil ejected essentially radially from the bearing surfaces 19, 20 therefore strikes the angled arm 26 of the bent sheet 24 and is fed back inwardly so that only a small portion of the bearing oil, if any, can enter the area near the seal faces 5, 6 of the sealing portion.

Furthermore, for the purposes of improving the oil retention effect, the cross-section of the outer circumference of the thrust ring 4 may, as shown, have a pitched-roof-like configuration, as is indicated by 27, so that a radially outwardly pointing spraying edge is formed, thus further constricting the access of the bearing oil to the axial plain bearing surfaces 5, 6.

The bearing oil emerging from the bearing surfaces 19, 20 and prevented from spreading in the space B by the oil retaining device 23 can accumulate at a lower location within space B or in a tank (not shown) of the axial plain bearing assembly and be fed back from there to the exterior through an oil discharge passage 28, e.g. to the engine compartment of the internal combustion engine.

In place of the oil retaining device described and shown in FIG. 1, an oil retaining device which is based on centrifugal effect such as that described in EP-A-1 054 196, which is incorporated by reference herein in its entirety, could also be envisaged.

Although the invention has been described hereinabove on the basis of an embodiment in which the gas-pumping grooves extend from the inner circumference of the seal face, a reversal of the situation could also be envisaged should there be no fear of access of non-gaseous constituents from space B into space A through the seal gap. Furthermore, the gas-pumping grooves may be formed in the non-rotational seal ring instead of the thrust ring, or they could also be formed in both rings if required.

Figure 3:
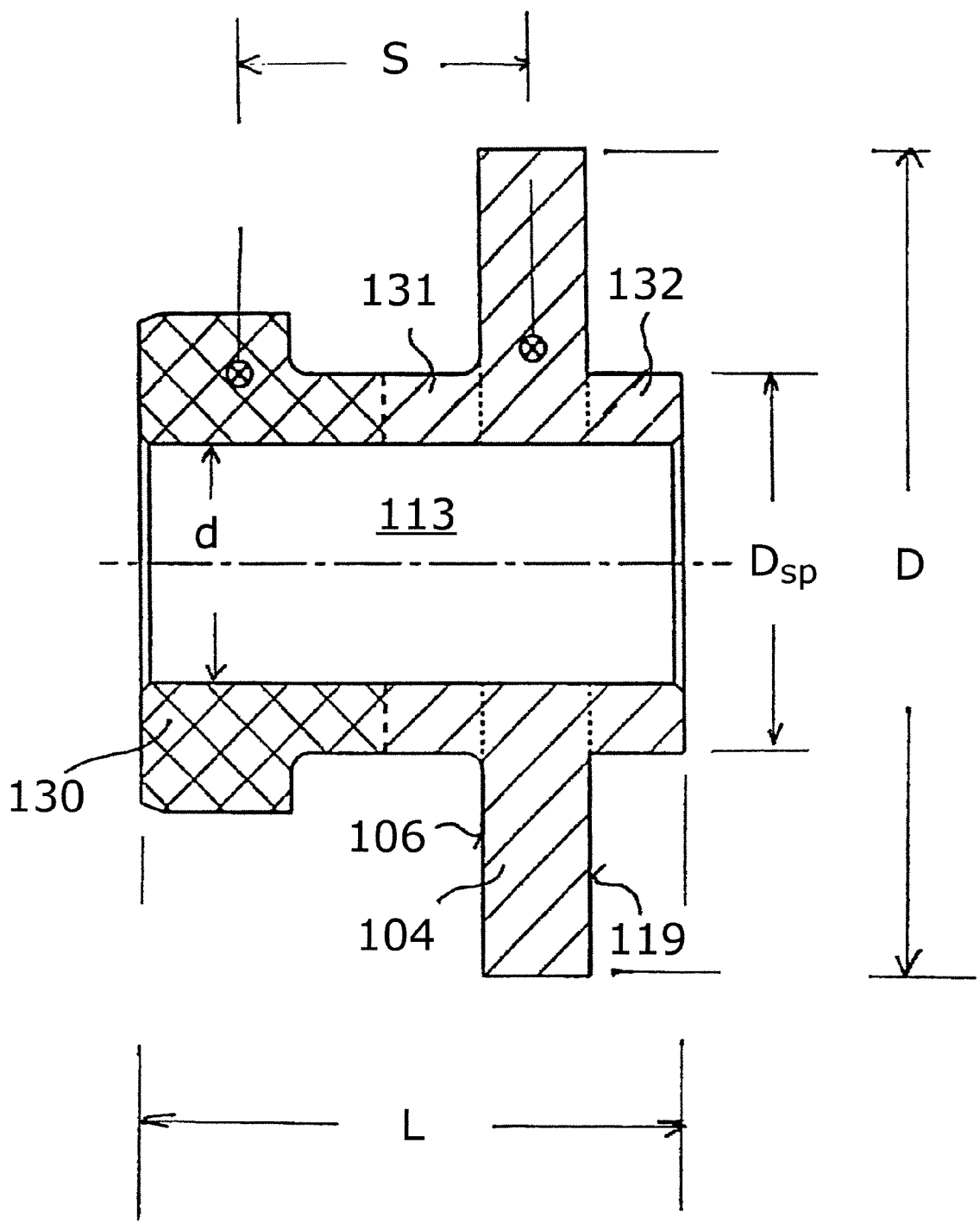
FIG. 3 is an enlarged longitudinal sectional view of one embodiment of a bushing for use with the axial plain bearing assembly of FIG. 1.

FIG. 3 shows another embodiment of a bushing 113 for use with the axial plain bearing assembly. Bushing 113 includes a mass ring 130 at a suitable axial distance from the side of thrust ring 104 having the seal face 106. The area covered by mass ring 130 is indicated by cross-hatching in FIG. 3. Between mass ring 130 and thrust ring 104 there is a spacer ring 131. Another spacer ring 132 is provided on the side of the thrust ring 104 having bearing face 119. The areas comprised by the spacer rings 131, 132 are defined by vertical dotted lines in FIG. 3. Mass ring 130, thrust ring 104, and spacer rings 131, 132 include coaxially oriented through bores for accommodating shaft 2. Preferably mass ring 130, thrust ring 104, and spacer rings 131, 132 are integral parts of bushing 113. While shown without numbering in FIG. 1 for sake of clarity, bushing 13 also includes a mass ring similar to mass ring 130 of FIG. 3, as well as spacer rings similar to spacer rings 131, 132. Bushing 113 of FIG. 3 can be disposed within the axial plain bearing assembly in the same manner as bushing 13 of FIG. 1. Moreover, both bushings 13, 113 operate in the following manner, described with respect to bushing 130.

Mass ring 130, during rotation of bushing 113, exerts a moment force on thrust ring 104 in a direction to deform thrust ring 104 (and thereby seal face 106 thereof) off from seal face 5 of seal ring 3 due to centrifugal forces acting on the mass ring 130. The deformation of thrust ring 104 resulting from centrifugal forces on mass ring 130 compensates for thermal distortion of thrust ring 104 caused by friction heat developed in the axial plain bearing portion, which is introduced into thrust ring 104 from the side thereof facing the axial plain bearing portion. The temperature on this side of thrust ring 104 generally is much higher than on the opposite side. Therefore, during operation thrust ring 104 would be subjected to a thermal distortion in the direction towards the seal ring 3. This would result in a narrowing of the gap between the seal faces 5, 106 and a change in the configuration of the gap, e.g. from a preferred parallel orientation of the seal faces 5, 106 all along the radial extension thereof, to a V-configuration associated with an increased wear of seal faces 5, 106. The moment force exerted by mass ring 130 creates a counter force to compensate for such distortion. The result is that thrust ring 104 and seal face 106 thereof maintain the desired predetermined orientation with respect to seal face 5 of seal ring 3.

The compensating moment forces increase with increased rotational speed of bushing 113. On the other hand a higher rotational speed of bushing 113 also causes a higher input of friction heat into thrust ring 104 from the bearing side thereof. Therefore, thermal distortion of thrust ring 104 caused by such heat input is automatically compensated for, regardless of the prevailing speed at which bushing 113 is rotating. It is to be noted that the masses and position of centers of gravity of spacer rings 131, 132 with respect of the position of the center of gravity of thrust ring 104 are such that they exert essentially the same moment force on the thrust ring 104 from opposite sides and therefore the effects of these rings neutralize each other.

Example

An axial plain bearing assembly was constructed in accordance with the present invention for use in a charge compressor of an internal combustion engine. The medium to be sealed was air. In the seal face 106 of the thrust ring 104 gas-pumping grooves (e.g., grooves 7) were incorporated and peripherally distributed. Tests showed that substantially full compensation of thermal distortion of the thrust ring 104 within a wide range of rotary speeds of the shaft 2 up to $10^5$ $min^{-1}$ could be obtained when a bushing 113 made of steel material and having a thrust ring 104, a mass ring 130, and spacer rings 131, 132 as integral parts thereof, was provided, which had the following parameters (also shown in FIG. 3): L=11 mm, D=17 mm, d=5 mm, $D_{Sp}$=8 mm, S=6 mm; mass of mass ring 130: 2.9 gr., mass of thrust ring 104: 3.2 gr., wherein L=overall length of bushing 113, D=outer diameter of thrust ring 104, d=diameter of bore in bushing 113, $D_{Sp}$=outer diameter of spacer rings 131, 132, S=axial distance between center of gravity of mass ring 130 and that of thrust ring 104.

A comparative test was performed by using an axial plain bearing assembly having no compensating mass ring 130 while the remaining design and parameters were the same as above. The test showed that the face seal portion of the assembly within a short time failed due to extreme wear of the seal faces 5, 106.

The above description of a preferred embodiment has been given by way of example. From the disclosure given, those skilled in the art will not only understand the present invention and the attendant advantages, but will also find apparent various changes and modifications to the structures disclosed. It is intended, therefore, that all such changes and modifications fall within the spirit and scope of the invention, as defined by the appended claims, and equivalents thereof.

What is claimed is:

1. An axial plain bearing assembly comprising:
a) a thrust ring provided for common rotation with a rotary component and a counter ring provided for mounting non-rotationally on a stationary component, said thrust and counter rings having bearing faces facing each other, and said thrust ring further having a radial seal face on an end face thereof remote from the counter ring for co-operating with a radial seal face of a non-rotational seal ring of a gas-lubricated mechanical face seal assembly for sealing said rotary and stationary components against each other;
b) wherein a plurality of peripherally spaced gas-pumping grooves are formed in at least one of the radial seal faces of the thrust and non-rotational seal rings, said gas-pumping grooves extending from one circumference of said one seal face towards the other circumference thereof and terminating at a radial distance from the other circumference, and wherein a mass ring connected with the thrust ring is provided at a side thereof remote from the counter ring at an axial distance from the thrust ring, the mass ring being configured and adapted to exert a balancing force on the thrust ring under centrifugal forces acting on the mass ring during common rotation of the mass and thrust rings to compensate for thermal distortion of the thrust ring during operation;
wherein said mass and thrust rings are provided as a single piece, and
further comprising a first spacer ring disposed between the mass and thrust ring.

2. An axial plain bearing assembly as recited in claim 1, wherein the counter ring includes at least one passage opening at the bearing surface of the counter ring for supplying bearing oil to the bearing surfaces.

3. An axial plain bearing assembly as recited in claim 1, further comprising means for removing bearing oil from an area peripherally outward of the bearing surfaces.

4. An axial plain bearing assembly as recited in claim 1, further comprising an oil retaining means encompassing the outer circumference of the bearing surfaces.

5. An axial plain bearing assembly as recited in claim 1, wherein said first spacer ring is integral with the mass ring at one axial end thereof and with the thrust ring at the other axial end thereof.

6. An axial plain bearing assembly as recited in claim 1, further comprising a second spacer ring disposed at a side of the thrust ring facing the counter ring.

7. An axial plain bearing assembly as recited in claim 6, wherein the second spacer ring is integral with the thrust ring.

8. An axial plain bearing assembly as recited in claim 1, wherein said one seal face has a surface area ratio $F_{GFA}/F_G$ within a range of between about 0.35 and about 0.65, where: $F_{GFA}$=total surface area of the gas-pumping grooves projected onto the seal face, and $F_G$=total surface area of the seal face.

9. An axial plain bearing assembly as recited in claim 1, wherein a load ratio k, defined as the ratio of an effective surface area $F_H$ of the face seal assembly hydraulically loaded by pressure of a medium being sealed to a surface area $F_G$ of the seal face is in a range of between about 0.5 and about 1.2.

10. An axial plain bearing assembly as recited in claim 1, wherein the gas-pumping grooves are provided on the thrust ring.

11. An axial plain bearing assembly as recited in claim 1, wherein the thrust ring includes a steel material.

12. An axial plain bearing assembly as recited in claim 1, wherein the counter ring includes a bronze bearing material.

13. An axial plain bearing assembly comprising:
   a) a thrust ring provided for common rotation with a rotary component and a counter ring provided for mounting non-rotationally on a stationary component, said thrust and counter rings having bearing surfaces facing each other, and said thrust ring further having a radial seal face on an end face thereof remote from the counter ring for co-operating with a radial seal face of a non-rotational seal ring of a gas-lubricated mechanical face seal assembly for sealing said rotary and stationary components against each other;
   b) a plurality of peripherally spaced gas-pumping grooves formed in at least one of the radial seal faces of the thrust and the non-rotational seal rings, said gas-pumping grooves extending from one circumference of said one seal face towards the other circumference thereof and terminating at a radial distance from the other circumference;
   c) a mass ring integrally connected with the thrust ring provided at a side thereof remote from the counter ring at an axial distance from the thrust ring, the mass ring being configured and adapted to exert a balancing force on the thrust ring under centrifugal forces acting on the mass ring during common rotation of the mass and thrust rings to compensate for thermal distortion of the thrust ring during operation;
   d) a first spacer ring disposed between the mass and thrust rings; and
   e) a second spacer ring disposed at a side of the thrust ring facing the counter ring, wherein said first spacer ring is integral with the mass ring at one axial end thereof and with the thrust ring at the other axial end thereof, and said second spacer ring is integral with the thrust ring, thereby forming an integral mounting unit including said thrust ring, said mass ring, and said first and second spacer rings.

14. An axial plain bearing assembly as recited in claim 13, wherein the gas-pumping grooves are provided on the thrust ring.

15. An axial plain bearing assembly as recited in claim 14, wherein said one seal face has a surface area ratio $F_{GFA}/F_G$ within a range of between about 0.35 and about 0.65, where: $F_{GFA}$=total surface area of the gas-pumping grooves projected onto the seal face, F.sub.$_G$=total surface area of the seal face.

16. An axial plain bearing assembly as recited in claim 13, wherein a load ratio k, defined as the ratio of an effective surface area $F_H$ of the face seal assembly hydraulically loaded by pressure of a medium being sealed to surface area $F_G$ of the seal face is in a range of between about 0.5 and about 1.2.

17. An axial plain bearing assembly as recited in claim 13, wherein the counter ring includes at least one passage opening at the bearing surface of the counter ring for supplying bearing oil to the bearing surfaces.

18. An axial plain bearing assembly as recited in claim 13, further comprising means for removing bearing oil from an area peripherally outward of the bearing surfaces.

* * * * *